(12) United States Patent
Olijnyk et al.

(10) Patent No.: US 7,270,430 B2
(45) Date of Patent: Sep. 18, 2007

(54) POWERED TELESCOPING TRAILER TOW MIRROR

(75) Inventors: Mark L. Olijnyk, Hallett Cove (AU); Daniel J. Flynn, Morphett Vale (AU)

(73) Assignee: Schefenacker Vision Systems Australia Pty Ltd. (AU)

( * ) Notice: Subject to any disclaimer, the term of this patent is extended or adjusted under 35 U.S.C. 154(b) by 0 days.

(21) Appl. No.: 11/057,334

(22) Filed: Feb. 11, 2005

(65) Prior Publication Data

US 2005/0200988 A1     Sep. 15, 2005

Related U.S. Application Data

(63) Continuation of application No. 10/488,703, filed as application No. PCT/AU02/01237 on Sep. 9, 2002, now Pat. No. 6,877,868.

(30) Foreign Application Priority Data

Sep. 7, 2001     (AU) .................................. PR7522

(51) Int. Cl.
    G02B 7/182      (2006.01)
    B60R 1/06       (2006.01)
(52) U.S. Cl. .................. 359/841; 359/872; 359/877; 359/881; 248/479; 248/480; 248/486
(58) Field of Classification Search ............. 359/841, 359/872, 877, 881; 248/479, 480, 486
    See application file for complete search history.

(56) References Cited

U.S. PATENT DOCUMENTS

| | | | |
|---|---|---|---|
| 4,558,930 A | 12/1985 | Deedreek | |
| 5,572,376 A * | 11/1996 | Pace | ........................... 359/877 |
| 6,239,928 B1 | 5/2001 | Whitehead et al. | |
| 6,276,805 B1 | 8/2001 | Home et al. | |
| 6,276,808 B1 | 8/2001 | Foote et al. | |
| 6,325,518 B1 | 12/2001 | Whitehead | |
| 6,394,616 B1 | 5/2002 | Foote et al. | |
| 6,416,192 B2 | 7/2002 | Home et al. | |
| 6,439,730 B1 | 8/2002 | Foote et al. | |
| 6,497,491 B2 | 12/2002 | Boddy et al. | |
| 6,505,943 B1 | 1/2003 | Olijnyk et al. | |
| 6,582,087 B2 | 6/2003 | Whitehead et al. | |

(Continued)

FOREIGN PATENT DOCUMENTS

WO     WO 00/26700     5/2000

(Continued)

*Primary Examiner*—Ricky D. Shafer (57) ABSTRACT

A vehicle external review-view mirror assembly having an extension and retraction mechanism for a telescopic arm support that connects a mirror head to a mirror mounting bracket is disclosed. The assembly comprises: a hollow outer arm extending from the bracket, an inner arm mounted to the head and extending into the outer arm for relative sliding movement out of and into the outer arm; a driving wheel rotatably mounted to the inner arm or the head; a driven wheel rotatably mounted to the inner arm and positioned within the outer arm at a location spaced apart from the driven wheel; and a toothed belt extending between the driving wheel and the driven wheel for power transmission between them. A pair of laterally spaced apart contact rollers are mounted coaxially with the driven wheel, the pair of contact rollers engaging spaced apart bearing surfaces depending from the outer arm.

12 Claims, 11 Drawing Sheets

U.S. PATENT DOCUMENTS

| | | |
|---|---|---|
| 6,726,337 B2 | 4/2004 | Whitehead et al. |
| 6,755,543 B1 | 6/2004 | Foote et al. |
| 6,848,816 B2 * | 2/2005 | Gilbert et al. .............. 362/494 |
| 6,863,407 B1 * | 3/2005 | Olijnyk et al. .............. 359/841 |
| 6,877,868 B2 * | 4/2005 | Olijnyk et al. .............. 359/841 |
| 6,929,372 B2 * | 8/2005 | Olijnyk et al. .............. 359/841 |
| 6,976,761 B2 * | 12/2005 | Olijnyk et al. .............. 359/841 |
| 7,040,770 B1 * | 5/2006 | Olijnyk et al. .............. 359/841 |
| 7,163,300 B2 * | 1/2007 | Olijnyk et al. .............. 359/841 |
| 7,165,853 B2 * | 1/2007 | Gilbert et al. .............. 359/841 |
| 7,172,298 B2 * | 2/2007 | Olijnyk et al. .............. 359/841 |
| 2004/0141245 A1 * | 7/2004 | Olijnyk et al. .............. 359/879 |

FOREIGN PATENT DOCUMENTS

| | | |
|---|---|---|
| WO | WO 00/47446 | 8/2000 |
| WO | WO 00/78573 | 12/2000 |

* cited by examiner

POWERED TELESCOPING TRAILER TOW MIRROR

CROSS-REFERENCE TO RELATED APPLICATIONS

This application is a continuation of U.S. patent application Ser. No. 10/488,703 filed Mar. 5, 2004 now U.S. Pat. No. 6,877,868 which is a National Stage of International Application No. PCT/AU02/01237, filed Sep. 9, 2002, which claims priority to Australian Patent Application Serial No. PR 7522, filed Sep. 7, 2001. The disclosures of the above applications are incorporated herein by reference.

BACKGROUND OF THE INVENTION

This invention relates to powered telescoping vehicle mirrors. More specifically, the invention relates to mechanisms for the extension or retraction of telescopic supports that are used to secure a mirror head of a rear vision mirror to a mounting bracket on a motor vehicle.

It is desirable to be able to move a mirror head, which holds a mirror, with respect to a mounting bracket on a motor vehicle away from or back towards the mounting bracket. This enables the mirror head to be positioned either close to the side of the motor vehicle, or to be extended away from the motor vehicle. In its extended position, an increased field of view behind the vehicle is provided. This is useful where the rear view may be obstructed by a load on the vehicle or a trailer that is being towed for instance.

Accordingly, it is an aim of the invention to provide a mechanism to extend or retract a mirror head.

It is a further object of this invention to provide a means whereby a mirror head can be both manually or automatically moved away or towards the mounting bracket of a motor vehicle mirror.

It is a still further object of the invention to provide a mechanism that has a high degree of efficiency enabling the use of a relatively small drive motor and associated gear train.

SUMMARY OF THE INVENTION

According to a first aspect of the invention, there is provided a vehicle external review-view mirror assembly having an extension and retraction mechanism for a telescopic arm support that connects a mirror head to a mirror mounting bracket, the assembly comprising:
  a hollow outer arm extending from the bracket;
  an inner arm mounted to the head and extending into the outer arm for relative sliding movement out of and into the outer arm;
  a driving wheel rotatably mounted to the inner arm or the head;
  a driven wheel rotatably mounted to the inner arm and positioned within the outer arm at a location spaced apart from the driven wheel;
  a looped transmission member extending between the driving wheel and the driven wheel for power transmission between them;
  a pair of laterally spaced apart contact rollers mounted coaxially with the driven wheel, the pair of contact rollers engaging spaced apart bearing surfaces depending from or integral with the outer arm; and
  a power transmission arrangement for transmitting power from the driven wheel to the outer arm,
  wherein rotation of the driving wheel drives the driven wheel through the looped transmission member which causes the outer arm to move telescopically with respect to the inner arm.

A pair of laterally spaced apart contact rollers and associated bearing surfaces contribute to the stability of the inner arm, and hence the head, with respect to the outer arm (and hence the bracket). This assists in preventing vibration of the mirror head and glass.

Transmission power from the driven wheel to the outer arm can be achieved in a number of ways. In a simple arrangement, the driven wheel is biased towards the transmission portion sandwiching the outer surface of the looped transmission member belt against an inside surface of the outer arm and providing a friction drive.

Preferably the power transmission arrangement for transmitting power comprises:
  a rack substantially within and depending from the outer arm; and
  at least one final drive pinion coaxially mounted to and driven by the driven wheel,
  wherein the pinion meshes with the rack for power transmission thereto.

Preferably the driving wheel is a driving sprocket, the driven wheel is a driven sprocket and the looped transmission member is a toothed belt.

Preferably the assembly has a pair of final drive pinions arranged one on each side of the driven sprocket.

Preferably each contact roller has an outside diameter substantially equal to that of the pitch circle diameter of the pinions and wherein the spaced apart bearing surfaces are arranged and constructed such that the contact rollers control the extent to which the pinions mesh with the rack. By controlling the extent to which the pinions mesh with the rack, wear can be minimised and power transmission can be optimised.

According to a second aspect of the invention, there is provided a vehicle external review-view mirror assembly having an extension and retraction mechanism for a pair of telescopic arm supports that connect a mirror head to a mirror mounting bracket, the assembly comprising:
  a pair of spaced apart substantially parallel hollow outer arms extending from the bracket;
  a pair of spaced apart substantially parallel inner arms mounted to the head and extending into respective outer arms for relative sliding movement out of and into respective outer arms;
  a drive motor mounted to the head;
  a drive shaft mounted to the head and extending between the inner arms;
  a pair of spaced apart driving wheels mounted to the drive shaft at opposite ends thereof and positioned substantially in line with respective inner arms; and
  a pair of arm drive mechanisms extending from respective drive wheels into respective outer arms, each arm drive mechanism having a looped transmission member extending into its respective outer arm to a driven wheel,
  wherein the drive motor drives the outer arms to move telescopically with respect to their respective inner arms.

Preferably each arm drive mechanism further comprises a pair of laterally spaced apart contact rollers mounted coaxially with the driven wheel, the pair of contact rollers engaging spaced apart bearing surfaces depending from or integral with its respective outer arm.

Preferably each arm drive mechanism further comprises:
 a rack substantially within and depending from its respective outer arm; and
 at least one final drive pinion coaxially mounted to and driven by the driven wheel,
 wherein the pinion meshes with the rack for power transmission thereto.

Preferably each driving wheel is a driving sprocket, each driven wheel is a driven sprocket and each looped transmission member is a toothed belt.

Preferably each arm drive mechanism comprises a pair of final drive pinions arranged one on each side of the driven sprocket.

Preferably each pair of contact rollers has an outside diameter substantially equal to that of the pitch circle diameter of the pinions and wherein the spaced apart bearing surfaces are arranged and constructed such that the contact rollers control the extent to which the pinions mesh with the racks.

Preferably the assembly further comprises a clutch operably positioned between the drive motor and the drive shaft, the clutch limiting the torque that can be transmitted between the drive motor and the drive shaft.

Preferably the clutch is a cone clutch. This type of clutch enables the mirror assembly to have a manual adjustment feel similar to that of existing manual telescoping mirrors such as that disclosed in the applicant's earlier file U.S. patent application Ser. No. 09/399,293 filed on 17 Sep. 1999 and its published corresponding Australian Application No. 56615/00.

A specific embodiment of the invention will now be described in some further detail with reference to and as illustrated in the accompanying figures. This embodiment is illustrative, and is not meant to be restrictive of the scope of the invention.

DETAILED DESCRIPTION OF THE PREFERRED EMBODIMENTS

A preferred embodiment of the invention is illustrated in the accompanying representations in which:

FIG. 7 is a vertical sectional view taken through section B-B shown on FIGS. 6 and 6a.

FIG. 11 is a vertical sectional view taken through section B-B shown on FIGS. 6 and 6a.

Figure 1:
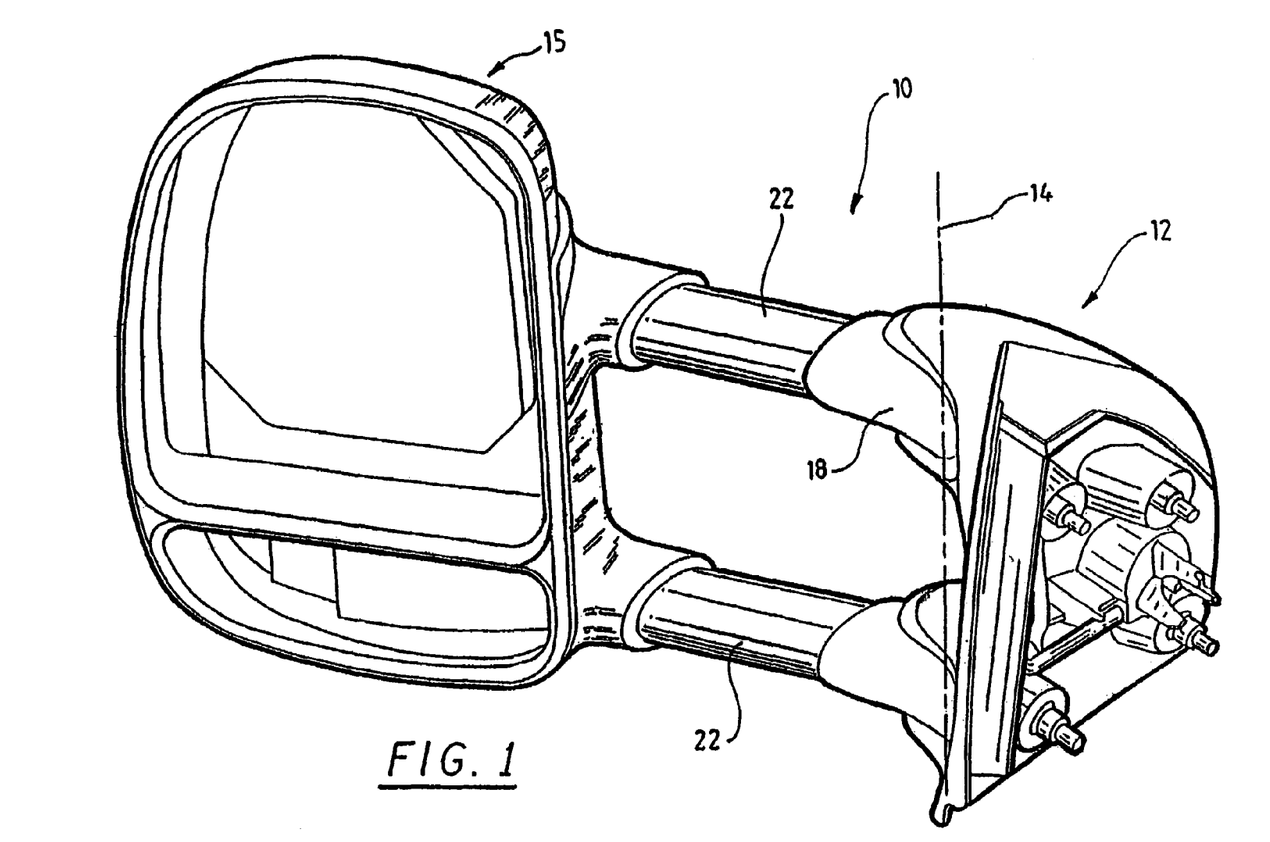
FIG. 1 is a perspective view of a telescoping vehicle external rear view mirror assembly.

A perspective view of a "Trailer Tow" type vehicle external mirror assembly 10 is shown in FIG. 1. This mirror assembly includes a mounting bracket 12, a pair of spaced apart substantially hollow parallel outer arms 22 extending from the bracket 12 and a mirror head 15. The mirror head 15 is movable with respect to the outer arms 22 from a retracted position to an extended position. In its extended position, the head is further displaced from the vehicle's side providing the vehicle driver with a wider field of view behind the vehicle. The mirror head 15 is also pivotable about a rotation axis 14.

Mirrors of the kind described above and shown in FIG. 1 can either be manually adjustable or can be both manually and automatically adjustable away from or towards the mounting bracket 12.

Figure 2:
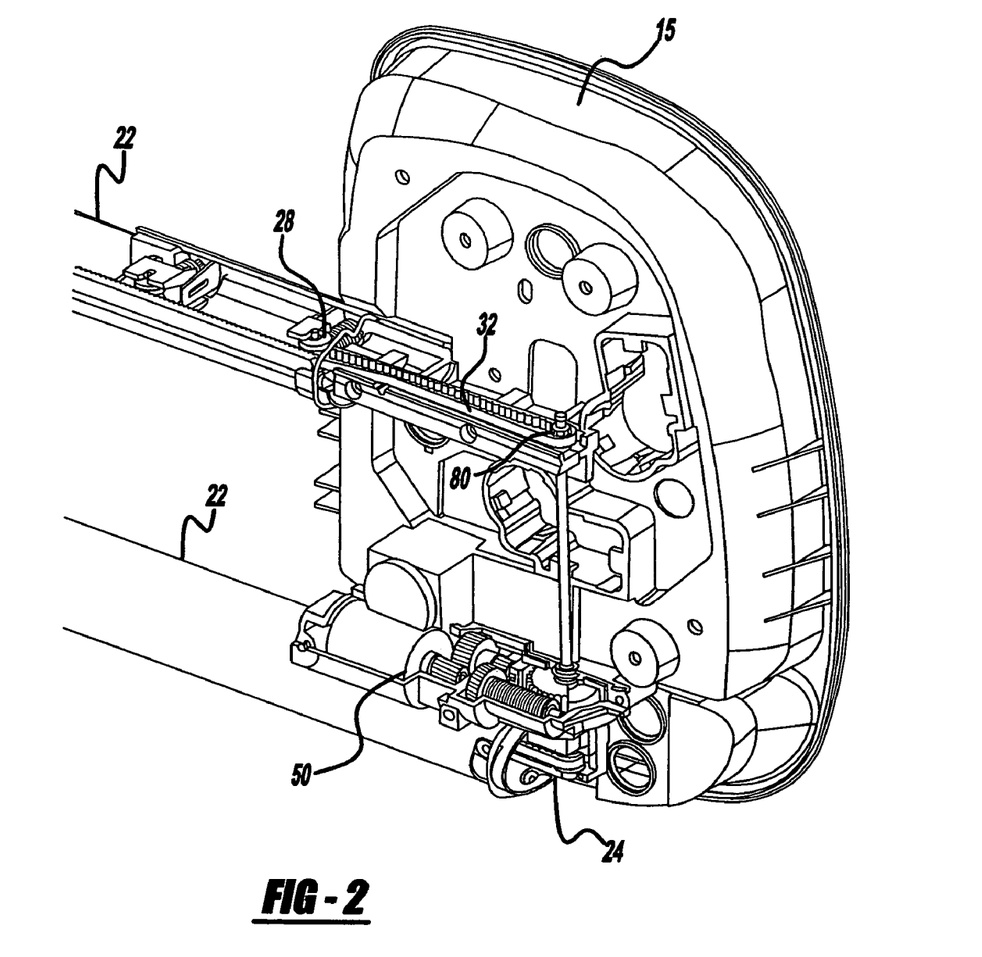
FIG. 2 is a cutaway perspective view of a telescoping vehicle external rear view mirror assembly according to the invention.

Referring now to FIG. 2, a vehicle external rear view mirror assembly having an extension and retraction mechanism for a pair of telescopic arm supports that connect a mirror head 15 to a mirror mounting bracket 12 (not shown in this Figure) is shown in a cut-away perspective view.

The mirror assembly includes a pair of spaced apart substantially parallel hollow outer arms 22 extending from the bracket 12 (not shown in FIG. 2).

Figure 3:
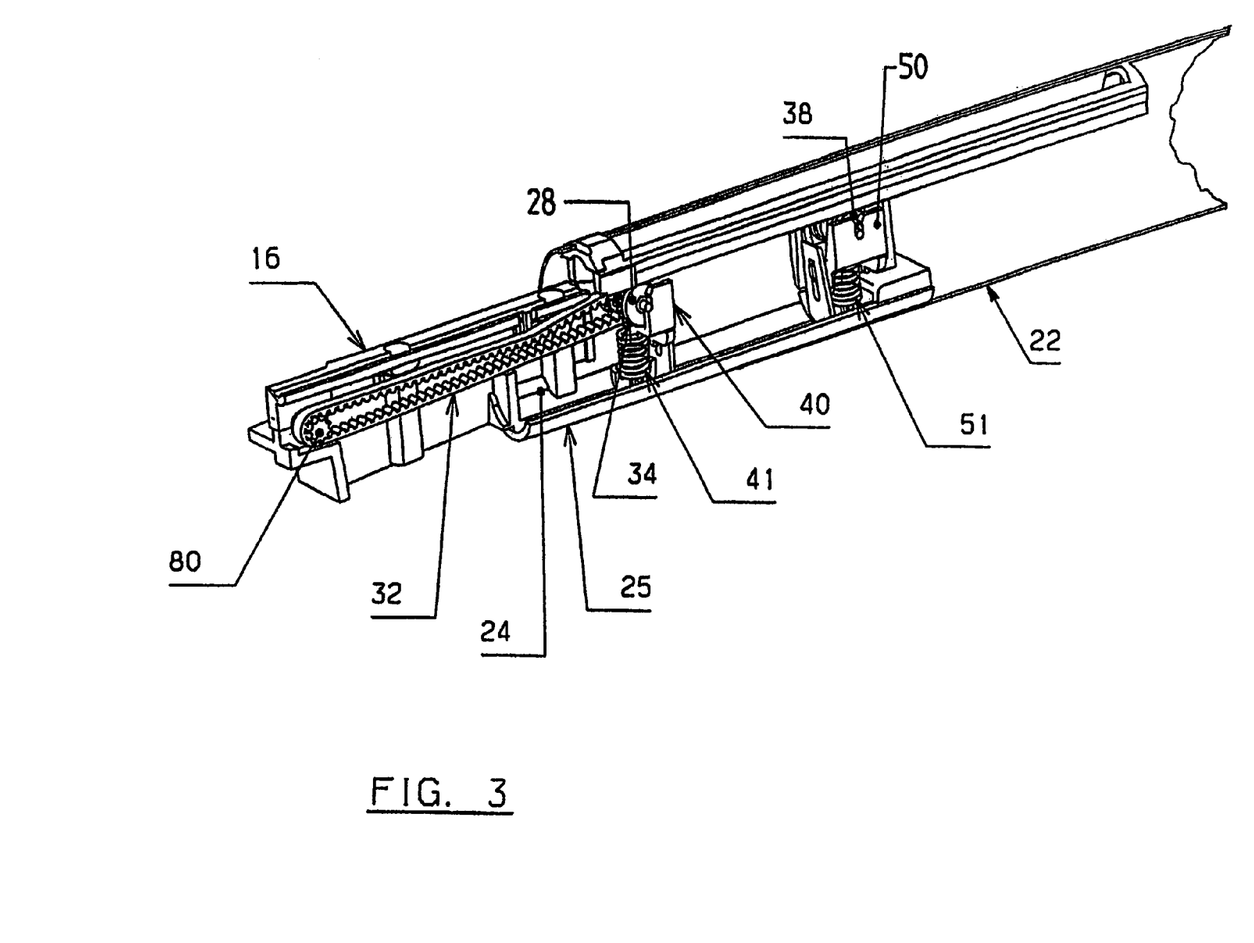
FIG. 3 is a cutaway perspective view of a part of the assembly of FIG. 2.

Componentry associated with the outer arm 22 and inner arm 24 is more clearly shown in the cut-away perspective view of FIG. 3. The inner arm 24 is provided with a low friction wear strip 25 which slides along the inner surface of the tubular outer arm 22.

Figure 4:
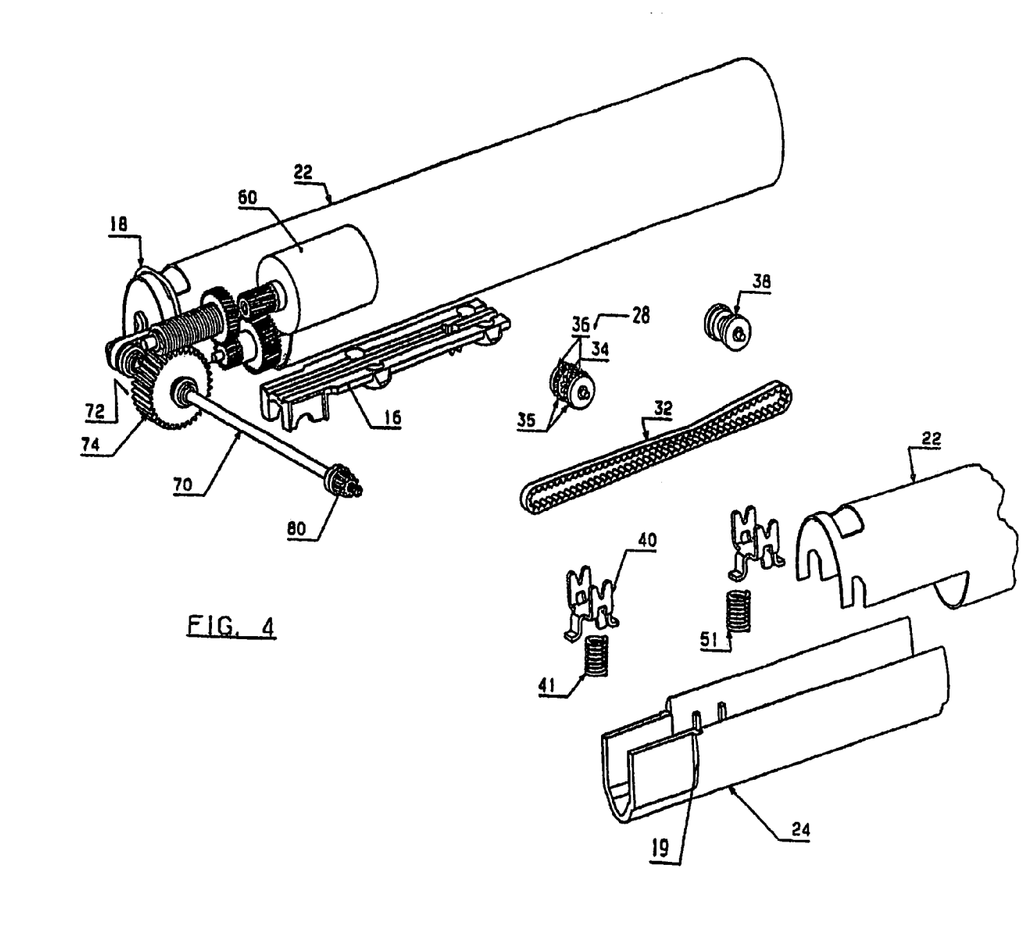
FIG. 4 is an exploded perspective view of the assembly of FIG. 2.

Now referring to FIG. 3, together with FIG. 4, a motor 60 (shown in FIG. 4) which is mounted to the head 15 drives a shaft 70 through a gear train and cone clutch assembly 72. Each end of pulley drive shaft 70 has a driving wheel 80 in the form of a sprocket. Shown most clearly in FIG. 3, driving sprocket 80 drives driven sprocket 34 through a looped transmission member in the form of a toothed belt 32.

A toothed belt has been found to be suitable as a synchronous flexible mechanical drive, however, other types of looped transmission members such as chains may also be used.

Figure 5:
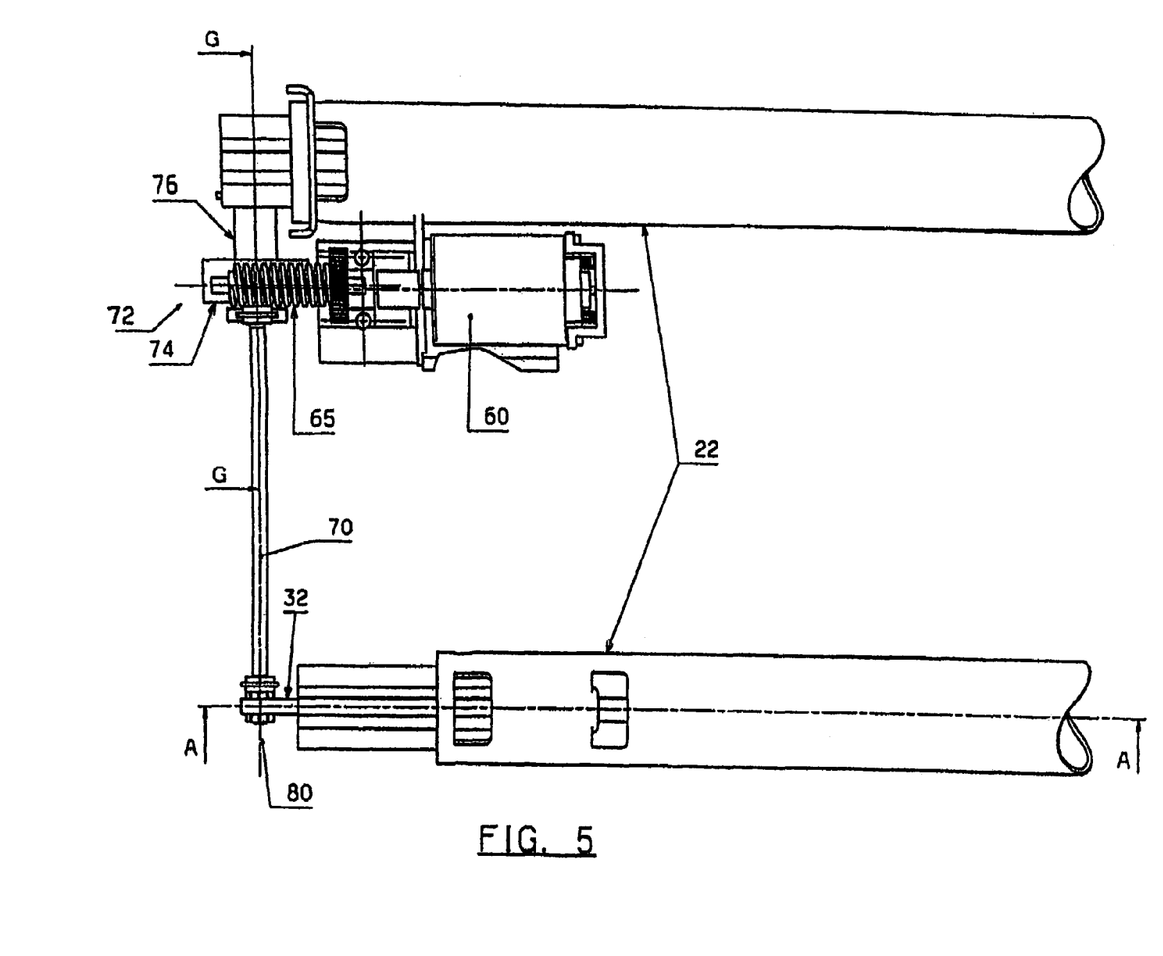
FIG. 5 is a partial front view of the assembly of FIG. 2 showing two parallel arms of the assembly and associated drive components.

The arm drive mechanisms, that drive the outer arms outwards and inwards telescopically with respect to their respective inner arms are more clearly shown by FIG. 5 and cross-sectional drawings 6,7, 8 and 9.

Figure 6:
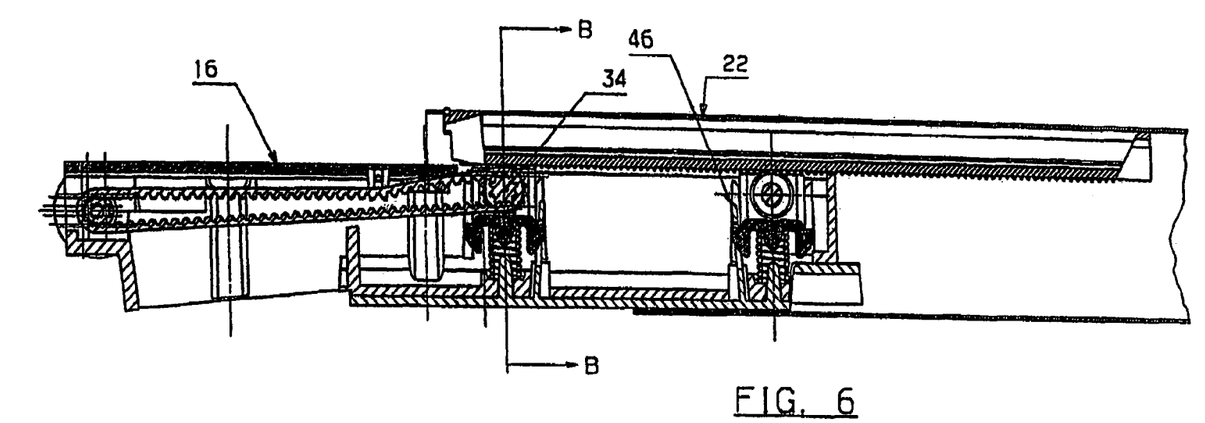
FIG. 6 is a vertical sectional view taken through section A-A as shown on FIG. 5.
Figure 6A:
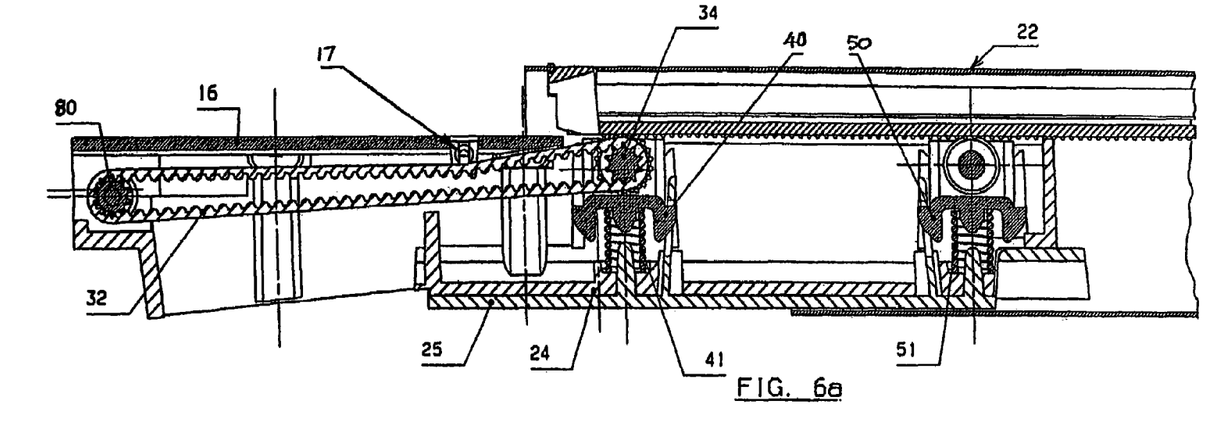
FIG. 6a is a magnified partial view of FIG. 6.
Figure 8:
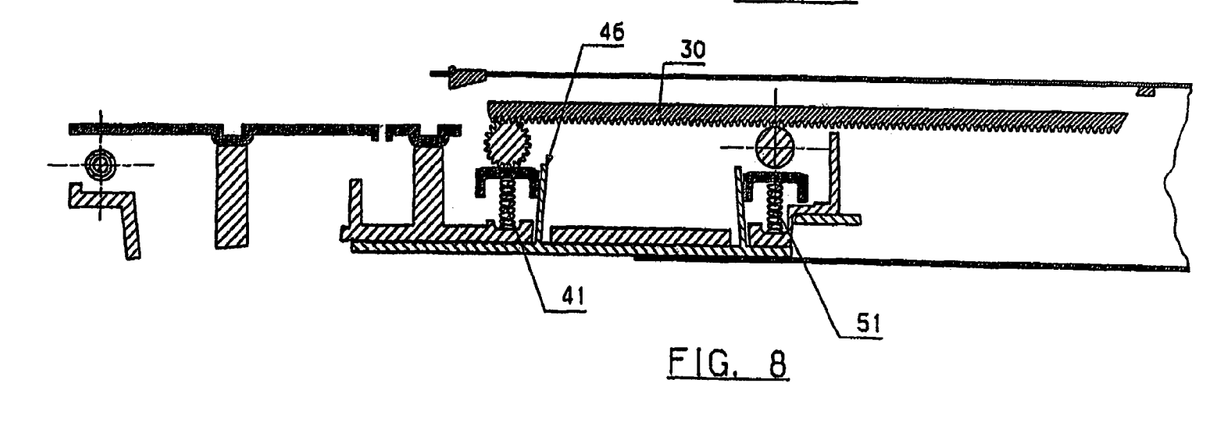
FIG. 8 is a vertical sectional view taken through section C-C shown on FIG. 7.
Figure 8A:
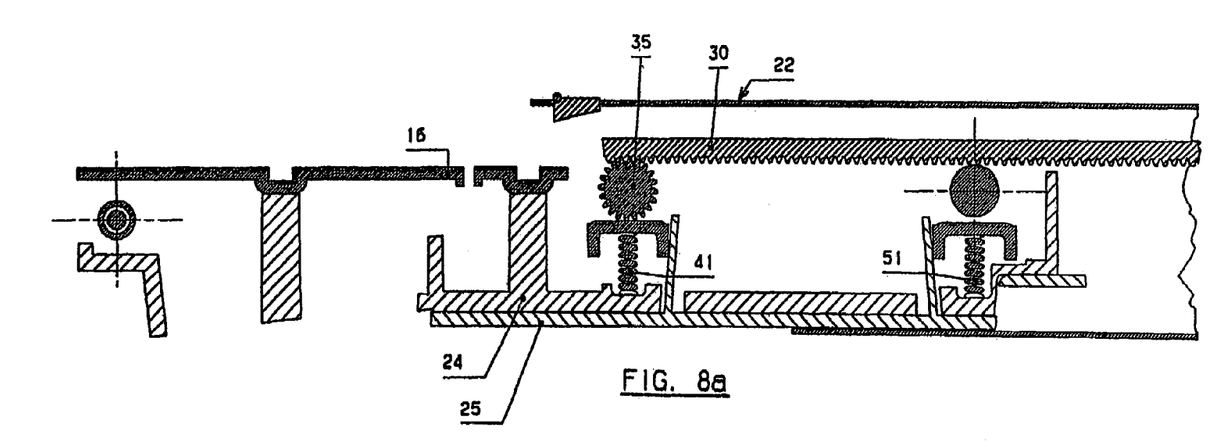
FIG. 8a is a magnified partial view of FIG. 8.

FIGS. 6 and 8 are vertical sectional views taken through sections A-A and C-C respectively as shown on FIG. 5. FIGS. 6a and 8a are magnified partial views of FIGS. 6 and 8 respectively. FIG. 8a shows a final drive wheel in the form of a pinion 35 engaging with a transmission portion in the form of a rack 30 attached to the outer arm 22. Pinion 35 is part of a single combination driven wheel 28 as shown in FIG. 4. Rotation of pinion 35 causes the rack 30, and hence the outer arm 22, to move linearly with respect to the inner arm 24.

Figure 7:
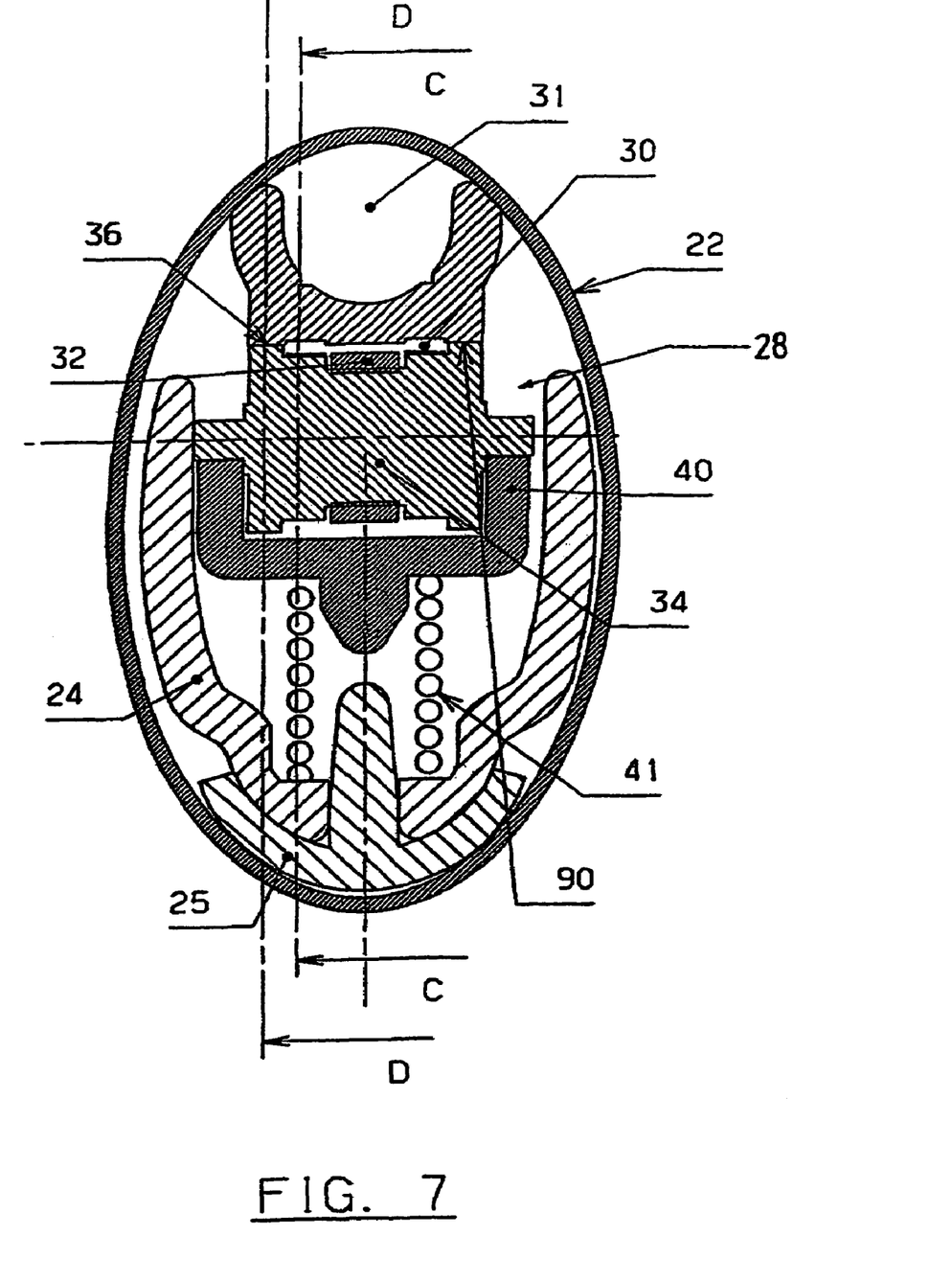

Viewing the perspective view of the combination driven wheel 28 shown in FIG. 4, together with the sectional views of FIGS. 6a, 8a and 7, it can be seen that wheel 28 has a central driven sprocket 34 sandwiched between a pair of pinions 35. This arrangement enables balanced transmission of movement from the toothed belt 32, through pinions 35 to the rack 30 and hence the outer arms 22.

In order to control the meshing of the pinions 35 with the rack 30 and in order to stabilize the arms with respect to each others contact, rollers 36 are provided on the outsides of the pinions 35. These contact rollers 36 roll against flat portions 90 which form tracks located adjacent the rack 30. The diameter of the contact rollers 36 are equal to the gear pitch circle diameter of the pinions 35 that mesh with rack 30. As a result, the rubbing velocity of the contact rollers 36 with respect to the tracks 90 alongside the rack 30 is zero or approximately zero. Therefore, less power is required to drive the mirror head 15 in and out with respect to the mirror bracket 12.

Figure 9:
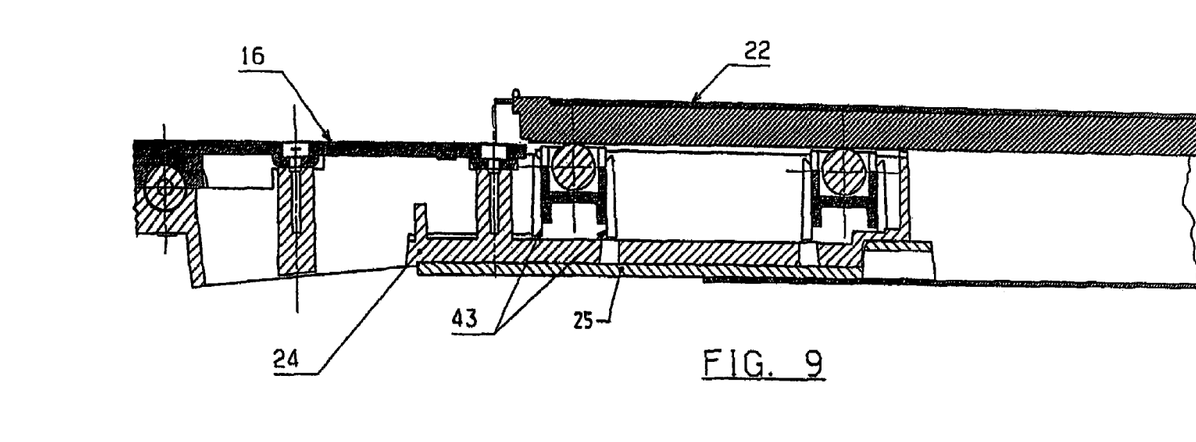
FIG. 9 is a vertical sectional view taken through section D-D shown on FIG. 7.

Contact rollers 36 are biased into engagement with flat portions 90 adjacent the rack 30 by a spring 41 as shown in FIG. 3. The spring is mounted to the inner arm 24. The combination wheel 28 is rotatably mounted to a carrier 40 which is positioned on one end of spring 41. The other end of spring 41 is retained against the inner arm 24 as shown in FIG. 3. Carrier 40 is guided within the inner arm 24 by guide ribs 43 as shown in FIG. 9 (section D-D). Carrier retention clips 46, shown in FIGS. 6a and 8a retain the carriers 40 and 50 during assembly. They also hold wear strip 25 against the inner arm 24 during assembly.

A second spring 51, carrier 40 and idler wheel 38 is shown in FIGS. 6a and 3. This second assembly, in conjunction with the first assembly, ensures that the inner arm 24 is held in a stable telescopic relationship with respect to outer arm 22. The action of the springs 41 and 51 at spaced apart positions along the inner arm 24 causes stability to be achieved between the outer arms 22 and the inner arms 24 and hence the mirror head 15 and mirror base 12. A wedging action between wear strip 25 and outer arm 22 as shown in FIG. 7 provides a high level of stability which reduces vibration-induced image displacement.

The central driven sprocket 34 performs two functions simultaneously. Firstly it transmits motive power through its pinions 35 to telescopically drive the mirror head 15 in and out from the bracket 12. Secondly it transmits the force generated by the compressed spring 41 from the inner arm 24 to the outer arm 22 so as to wedge the wear strip 25 against the outer arm 22 thereby eliminating, or at least reducing any slop between the inner and outer arms 24 and 22. The use of a single combination wheel to perform these two distinct functions simplifies the overall mirror assembly significantly.

A reinforcement member 16 shown in FIGS. 4, 6, 8 and 9 is attached to the inner arm 24 and mirror head 15 as best shown in FIG. 9 (a vertical sectional view taken through section D-D shown on FIG. 7). The reinforcement member 16 supports components including guide roller 17 as shown in FIG. 6a.

Guide roller 17 guides the toothed belt 32 and tensions the belt 32 as the mirror assembly is assembled.

Power for the drive mechanisms is provided by motor 60 shown most clearly in FIGS. 4 and 5. The motor 60 drives a reduction gear box terminating in a worm gear 65 that meshes with a clutch gear 74. The motor gear drive mechanism is non-back drivable due to the provision of the worm gear 65 that engages the clutch gear 74. This prevents the clutch gear 74 from rotating when the mirror head 15 is forced towards or away from the mirror bracket 12. This ensures that the gear train does not back drive and that the clutch 72 operates.

Figure 12:
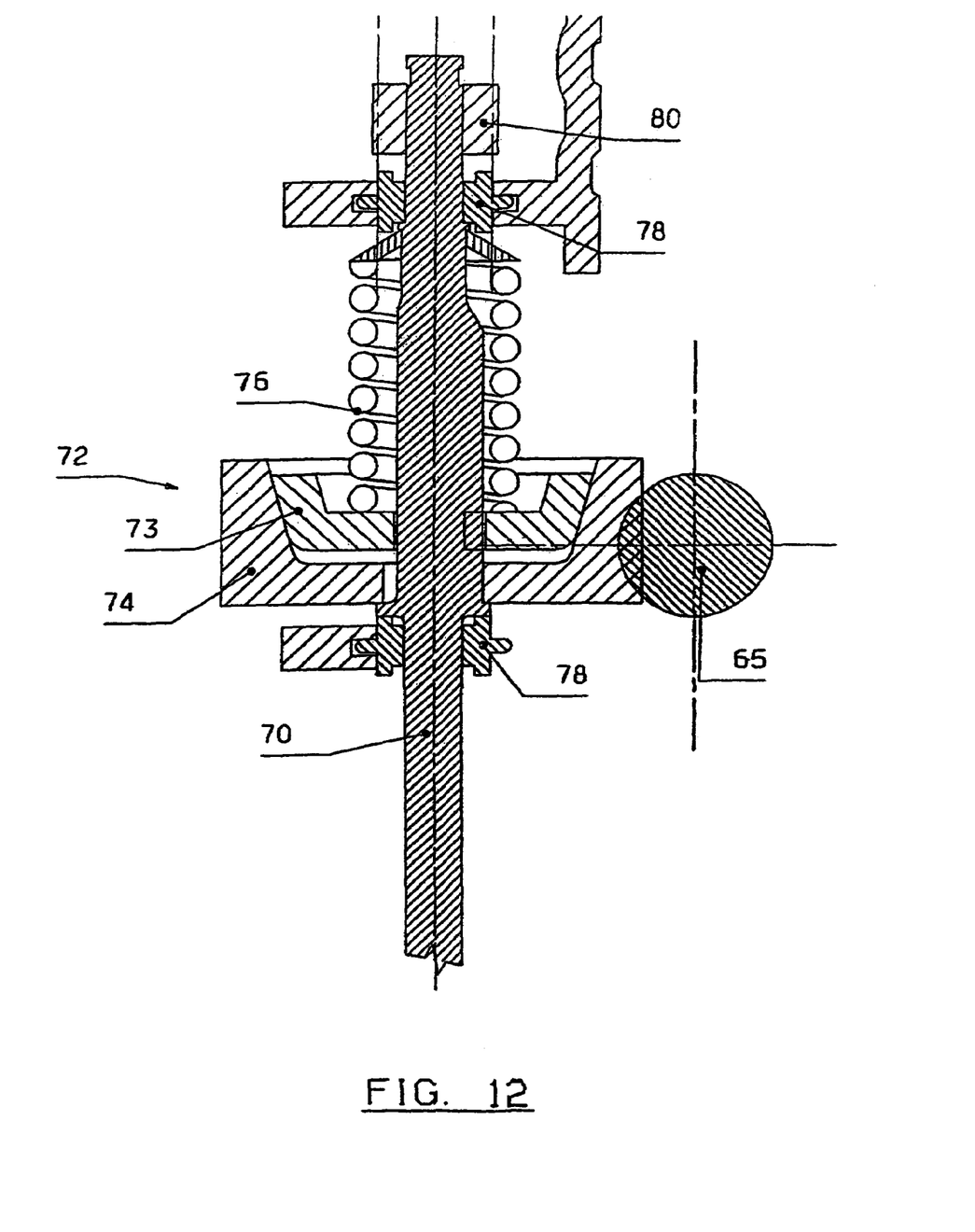
FIG. 12 is a vertical sectional view taken through section G-G as shown on FIG. 5.

Meshing between worm gear 65 and clutch gear 74 is most clearly shown in the sectional view of FIG. 12 (taken through section G-G shown in FIG. 6). This Figure also shows a cone clutch assembly 72 comprising clutch gear 74 and cone-shaped clutch disc 73.

Clutch disc 73 is keyed to a shaft 70 that is mounted to the head 15 on bearings 78 and extends between the inner arms.

The clutch assembly 72, positioned between the worm gear 65 and the drive shaft 70 limits the torque that can be transmitted between the drive motor 60 and the drive shaft 70. The cone clutch design enables a relatively low spring force (spring 76) to be used and enables the components to be kept to a compact size while at the same time providing a smooth, friction adjustment feel to the mirror head as it is moved manually out from or towards the bracket 12. The result is an adjustment feel that is similar to existing manual telescoping mirrors.

Alternative designs using different clutching arrangements can also be used. For instance, clutches incorporating detenting ramps can also be used which would provide a ratcheting type manual override adjustment feel with associated indexing clicking noises.

Drive shaft 70 extends between the two inner arms 22 as best shown in FIG. 2. A pair of spaced apart driving pulleys in the form of drive sprockets 80 are provided at opposite ends of drive shaft 70. Driving sprockets 80 are positioned substantially in line with respective inner arms 22 and drive driven sprockets 34 through toothed belts 32.

The use of a synchronized flexible mechanical drive in the form of toothed belts 32 to remotely drive the rack and pinion mechanism within each arm provides an efficient and compact synchronized drive to the pair of arms. Both toothed belts 32 are driven by a single connecting drive shaft 70, so that the drive between each arm remains the same and makes the potential problem of skew drive jamming unlikely, if not impossible.

End of travel stops are provided by components independent to the drive mechanism so that damage to the drive train is not caused by impact or external forces that the mirror head 15 may be subjected to. Clips 18, shown in FIG. 4 provide an end stop against shoulder 19 on inner arm 24.

Referring to FIG. 7, it can be seen that the spring loaded pinion drive comprising spring 41, carrier 40, central driven sprocket 34 and rack 30 together with tracks 90, provides a compact assembly for driving the outer arms 22 with respect to the inner arms 24. A cabling harness conduit 31 is provided above the rack 30.

An optional current sensing circuit can be included to turn off the electric motor 60 thereby preventing the clutch assembly 72 from slip dis-engaging at the ends of travel and therefore preventing the unnecessary running of the motor, reduction gears and clutch.

The embodiment described above is a dual arm mirror assembly. However, the invention is also applicable to a single arm mirror.

Figure 10:
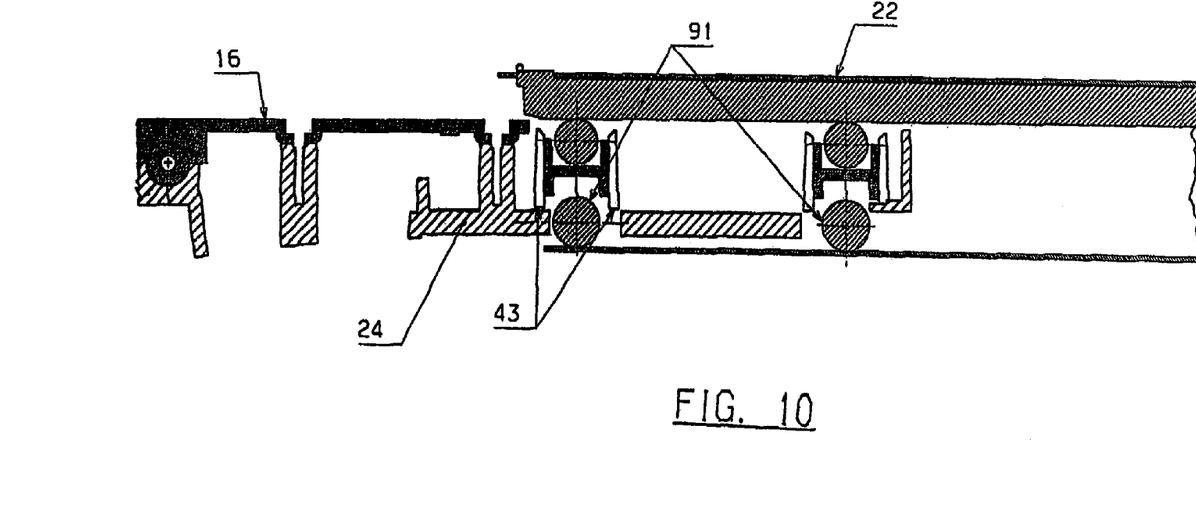
FIG. 10 is a vertical sectional view taken through section H-H shown on FIG. 11 showing an alternative embodiment of the invention.
Figure 11:
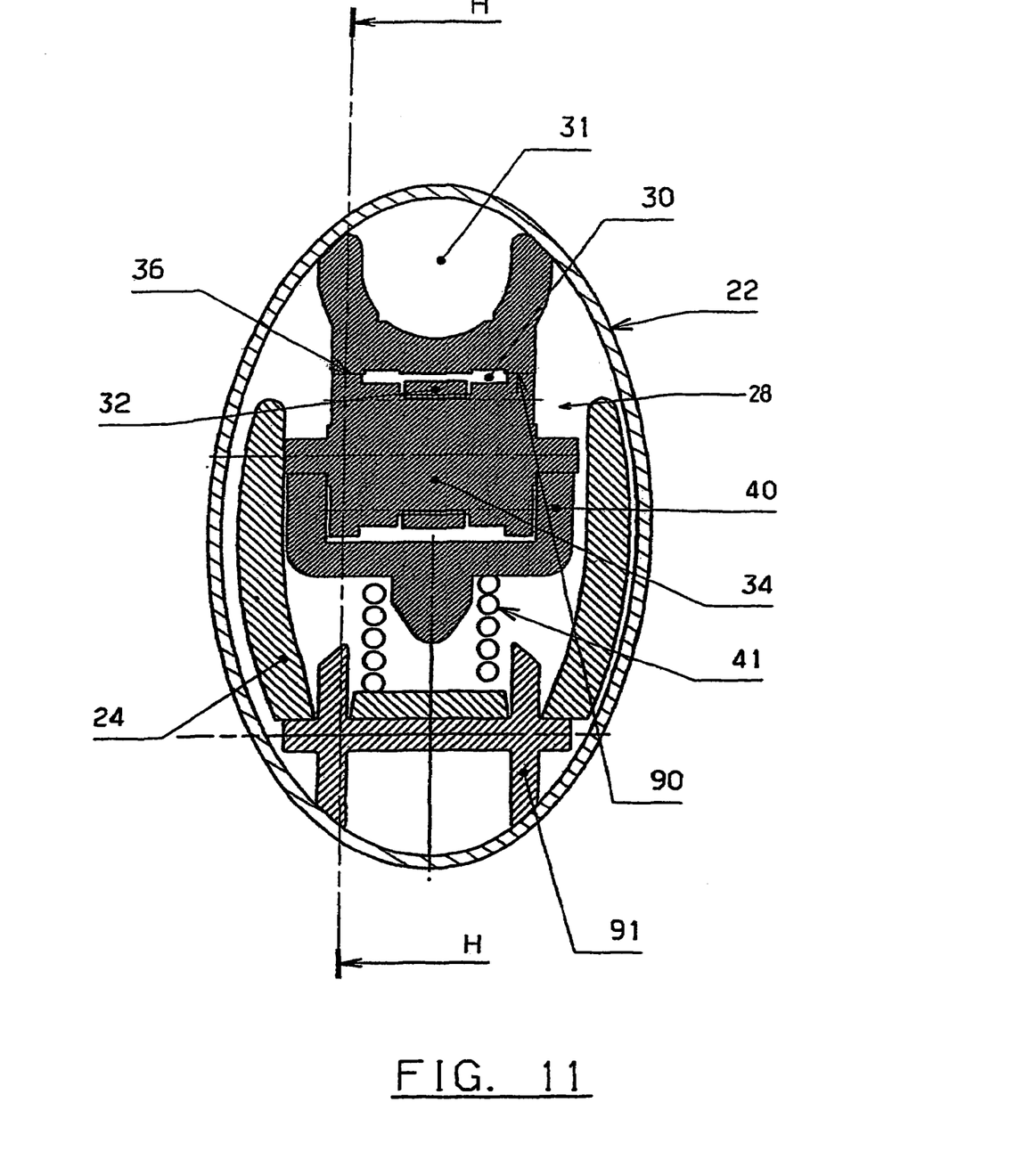

In a second embodiment of the invention, the wear strip 25 shown in FIG. 9 is replaced with an arrangement including a pair of rollers pair 91, as shown in FIG. 10 (a vertical sectional view taken through section H-H shown in FIG. 11). One of the roller pair is shown in cross section in FIG. 11. The second embodiment of the invention eliminates sliding contact between the inner and outer arms 24 and 22 and therefore reduces the friction between them.

Australian Patent Application No. 68997/98 titled "A mirror operating mechanism", International Patent Application No. PCT/AU00/00009 titled "A mirror rotation mechanism" and International Patent Application No. PCT/AU00/00076 titled "Mirror parking mechanism" described power fold mechanisms which move a mirror head from its normal in use position to a parked position where the mirror head is rotated towards the body of the vehicle. Any of these inventions could be used with the assembly described in this invention and the disclosure of these specifications is herewith incorporated in their entirety into this specification.

International Application No. PCT/AU02/00353 titled "External vehicle mirror having self-loading pivot and improved end stop" discloses a mirror assembly having a self-loading pivot mechanism wherein initial rotation of the mirror head with respect to the mirror base causes preloading of a spring. These features and other features disclosed could be used with the present invention and the disclosure of PCT/AU02/00353 is herewith incorporated in its entirety into this specification.

International Application No. PCT/AU00/00413 titled "Method of producing a plastic moulded part including a film covering" discloses a method of forming a moulding component comprising an outer thin film component with an adhered moulded shell. The method of that disclosure could be used to mould the hollow form components subject of this invention and the disclosure of this application is incorporated herewith in its entirety.

It would also be possible to incorporate other components with the mirror mounting bracket head and/or arms. Such components include electronic sensors such as proximity sensors to determine if the vehicle mirror is close to an obstruction, sensors that sense external temperature and humidity, and sensors incorporated with the car security system such as motion detectors. Other various electronic equipment may be incorporated into the mirror mounting brackets such as lights used to light the area around the vehicle, or lights that may be controlled from within the vehicle that enable the light to be moved so as to provide directional lighting. Speakers and microphones used to communicate to people external of the vehicle may also be incorporated as well as antennas for various apparatus such as mobile phones, GPS devices and other radio communication devices. In addition, transmitters may be incorporated into the mounting bracket, which are used for controlling external objects such as garage doors or providing radio transmissions which may be used, for example, to track or locate the vehicle. Other electronic devices such as automatic toll payment systems or remote transaction systems may be incorporated into the mounting bracket to enable electronic registration of various toll payments.

Cameras may also be incorporated into the mounting bracket, which are both forward and rearward looking which are designed to continuously record digital images and to store those images either on command or as a result of an accident or incident. Motion sensors including accelerometers can be used to determine the occurrence of an accident or incident so that images before and after the event are stored.

While the present invention has been described in terms of preferred embodiments in order to facilitate better understanding of the invention, it should be appreciated that various modifications can be made without departing from the principles of the invention. Therefore, the invention should be understood to include all such modifications within its scope.

What is claimed is:

1. A vehicle external rear view mirror assembly comprising:
   a mirror head;
   a mount for connecting said mirror assembly to a vehicle;
   an outer arm extending from said mount;
   an inner arm mounted to said mirror head and extending into said outer arm for relative sliding movement out of and into said outer arm;
   a driving wheel mounted to said inner arm or said mirror head;
   a motor mounted to said mirror head;
   a gear train connected between said motor and said driving wheel for transferring power from said motor to said driving wheel; and
   a clutch member forming part of said gear train, wherein said clutch member functions to selectively disengage said motor from said driving wheel;
   a rack disposed substantially within and connected to said outer arm; and
   at least one drive pinion formed on said driving wheel, wherein said drive pinion meshes with said rack for transmitted power thereto.

2. The vehicle external mirror of claim 1 wherein the rotation of said gear train causes said inner arm to move telescopically with respect to said outer arm.

3. The vehicle external mirror of claim 1 wherein said clutch member allows for said mirror head to be positioned manually by disengaging said motor from said driving wheel.

4. The vehicle external mirror of claim 1 wherein said clutch member comprises a clutch disk operably engaged to said motor, so that said clutch disk limits the amount of torque that can be transmitted between said motor and said driving wheel.

5. The vehicle external mirror of claim 1 further comprising a looped transmission member extending between said driving wheel and said gear train for the transmission of power between said motor and said driving wheel.

6. The vehicle external mirror of claim 1 wherein said clutch member allows for manual placement of said mirror head.

7. A vehicle external rear view mirror assembly comprising:
   a mirror head;
   a mount for connecting said mirror assembly to a vehicle;
   an outer arm extending from said mount;
   an inner arm mounted to said mirror head and extending into said outer arm for relative sliding movement out of and into said outer arm;
   a driving wheel mounted to said inner arm or said mirror head;
   a motor mounted to said mirror head;
   a gear train connected between said motor and said driving wheel for transferring power from said motor to said driving wheel;
   a clutch member forming part of said gear train, wherein said clutch member functions to selectively disengage said motor from said driving wheel;
   a rack having a plurality of gear teeth disposed substantially within and connected to said outer arm;
   two or more gear teeth formed on said driving wheel; and
   two or more gear teeth formed on each gear in said gear train, wherein said two or more gear teeth of said driving wheel are in meshed engagement with said gear teeth on said rack and said gear teeth on said at least one gear of said gear train for transmitting power from said gear train to said driving wheel.

8. The vehicle external mirror of claim 7 wherein the rotation of said gear train causes said inner arm to move telescopically with respect to said outer arm.

9. The vehicle external mirror of claim 7 wherein said clutch member allows for said mirror head to be positioned manually by disengaging said motor from said driving wheel.

10. The vehicle external mirror of claim 7 wherein said clutch member comprises a clutch disk operably engaged to said motor, so that said clutch disk limits the amount of torque that can be transmitted between said motor and said driving wheel.

11. The vehicle external mirror of claim 7 further comprising a looped transmission member extending between said driving wheel and said gear train for the transmission of power between said motor and said driving wheel.

12. The vehicle external mirror of claim 7 wherein said clutch member allows for manual placement of said mirror head.

* * * * *